Dec. 8, 1925.  
G. H. HARRIS  
1,564,784  
OVERSHOT DRAPER FOR HEADERS  
Filed June 5, 1923

INVENTOR.  
George H. Harris  
BY  
ATTORNEY

Patented Dec. 8, 1925.

1,564,784

UNITED STATES PATENT OFFICE.

GEORGE H. HARRIS, OF STOCKTON, CALIFORNIA.

OVERSHOT DRAPER FOR HEADERS.

Application filed June 5, 1923. Serial No. 643,562.

*To all whom it may concern:*

Be it known that I, GEORGE H. HARRIS, a citizen of the United States, residing at Stockton, county of San Joaquin, State of California, have invented certain new and useful Improvements in Overshot Drapers for Headers; and I do declare the following to be a full, clear, and exact description of the same, reference being had to the accompanying drawings, and to the characters of reference marked thereon, which form a part of this application.

This invention relates to improvements in the construction of the spouts or inclined drapers provided on harvesters, and used to convey the cut stand from the horizontal draper under the header reel to the feed house of the harvester.

As at present constructed, these spouts discharge their load in a direct line ahead of them, and toward the back of the feed house. Even when the harvester is working on level ground, this has the disadvantage that the cut product discharged from the spout piles up at the back of the feed house, from which point it must sooner or later be manually dislodged in order to cause the grain to pass from the feed house as it should, and allow the harvester to operate efficiently and without interruption.

This disadvantage however is accentuated when the harvester is operating on side hills, during which time the normal slant of the spout is altered while the harvester proper remains in a horizontal plane.

The principal object of my invention therefore is to provide in connection with the main draper of the spout, what I term an overshot draper, arranged not only to assist in raising the cut grain along the main draper, but what is more important, to cause the grain when discharged to be thrown downwardly into the feed house instead of toward the back thereof, and regardless of the angle of setting of the spout relative to the feed house.

A further object of the invention is to provide a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1:
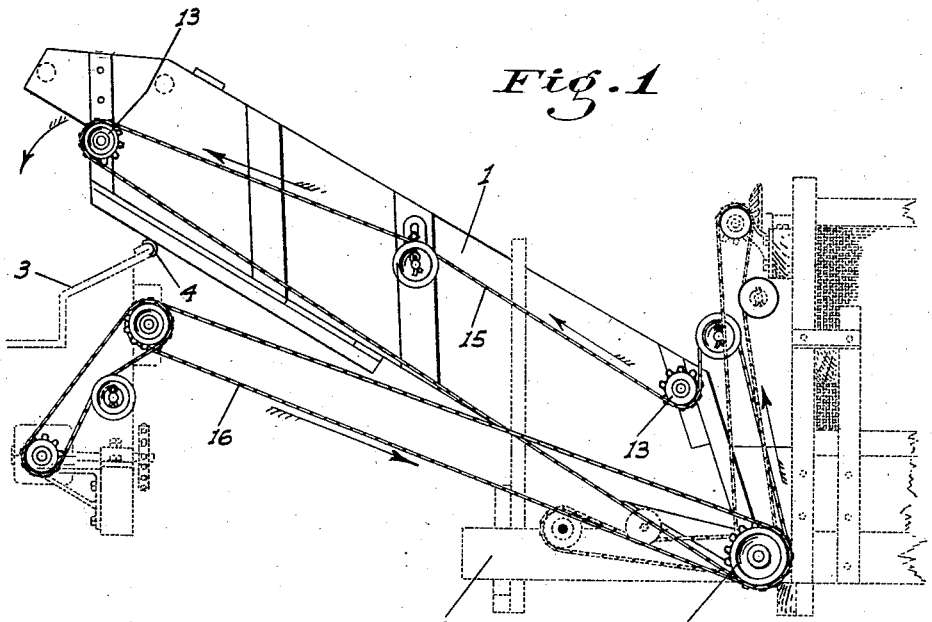
Fig. 1 is an exterior view of my improved spout, showing the driving means for the drapers thereof.
Figure 2:
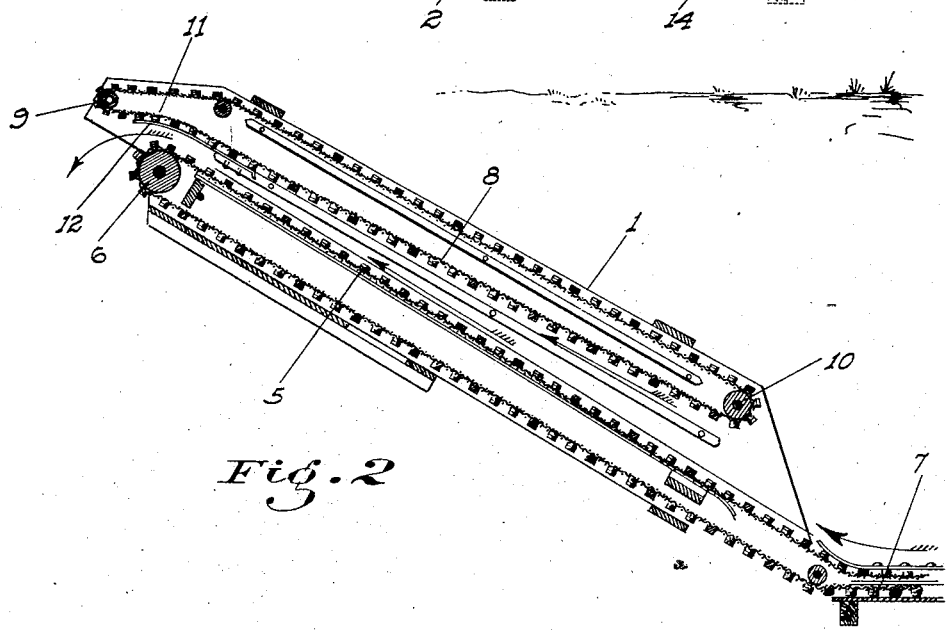
Fig. 2 is a sectional elevation of the spout.

Referring now more particularly to the characters of reference on the drawings, the numeral 1 denotes the side frames of the spout, pivoted at its lower end as usual on the header frame 2 and projecting at its upper end into the feed house 3 through the usual opening in the front thereof, and slidably rests on the bottom sill 4 of said opening.

Adjacent the bottom of the spout and extending lengthwise thereof is the main draper 5, of the usual construction, passing over a roller 6 at its upper end, and being a continuation of the horizontal draper 7 of the header, as is customary.

Mounted in the sides 1 above the draper 5 is the overshot draper 8, of endless construction, and passing over rollers 9 and 10 at its upper and lower ends respectively.

The major portion of the lower run of the draper 8 is straight, and converges toward the adjacent or upper run of the draper 5 from its lower to its upper end, to a point substantially just behind the roller 6. Above that point, and to its upper end at the roller 9, the said lower run of the draper 8 is caused to have an easy downward curve as shown at 11, this curvature being maintained by suitably curved spring guide strips 12 at the edges of the draper, these strips being only supported at their rear ends so that a yielding or flexible action of the main portion thereof will be had.

The roller 9 of the overshot draper is ahead of the roller 6 which marks the upper termination of the main draper, and is so located that the underside of the draper 8 at that point is just about on a line extending from the upper run of the draper 5. This arrangement as will be evident, causes the grain to be discharged downwardly from between the drapers, while the converging of the adjacent runs thereof causes the grain, as it is raised, to be compressed somewhat, so that when discharged it will be in compact form.

The two drapers are driven in common by means of sprocket wheels 13 connected to rollers 9 and 10, and a sprocket wheel 14 at the point of pivotal connection of the spout with the frame 2, over which wheels 13 and 14 a driven chain 15 passes in a manner to cause the adjacent runs of the drapers to move in the same direction.

The sprocket wheel is itself driven in any suitable manner, such as by means of the chain drive 16 as shown.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a harvester a draper arranged to convey the grain as cut from the header to the feed house of the harvester, an auxiliary draper positioned above and in spaced relation to the main draper and extending a certain distance beyond the upper end of the same, and means for causing the overshot portion of the auxiliary draper to have a permanent downward deflection towards its front end and for preventing the same from approaching the main draper beyond a predetermined limit.

2. In a harvester, an upwardly sloping draper arranged to convey the grain as cut from the header to the feed house of the harvester, an auxiliary draper above the main draper, a roller over which said auxiliary draper passes mounted ahead of and above the upper end of the main draper, and guide means for the under run of the overshot portion of the auxiliary draper arranged to cause said portion to be in a substantially horizontal plane a certain distance above the upper end of the main draper.

In testimony whereof I affix my signature.

GEORGE H. HARRIS.